United States Patent [19]

Aloy et al.

[11] 4,058,584
[45] Nov. 15, 1977

[54] METHOD FOR MANUFACTURING LUMINOUS HOLLOW BODIES FOR SIGNS OR THE LIKE

[76] Inventors: Enrique Ubach Aloy, Avenida Madrid, 12; Pedro Ubach Aloy, Calle La Gleva, 42, both of Barcelona; José Maria Genovart Aguiló, Calle Victoria, 211, San Baudilio De Llobregat, all of Spain

[21] Appl. No.: 563,959

[22] Filed: Apr. 1, 1975

[30] Foreign Application Priority Data

Apr. 5, 1974 Spain .................................. 425384

[51] Int. Cl.² ............................................. B29H 9/00
[52] U.S. Cl. .................................. 264/250; 40/125 E; 40/136; 156/69; 156/288; 264/255; 264/267; 264/268; 264/308; 264/320
[58] Field of Search ............... 264/250, 255, 259, 261, 264/294, 296, 271, 308, 267–268, 258, 246–247, 266, 325, 320, ; 156/242, 288, 69, 102, 218; 40/136, 125 E; 240/2 AT, 2 W

[56] References Cited

U.S. PATENT DOCUMENTS

| 1,668,590 | 5/1928 | Hilfreich | 264/261 |
|---|---|---|---|
| 2,651,079 | 9/1953 | Michaelson et al. | 264/247 |
| 2,782,544 | 2/1957 | Tobin | 40/136 |
| 3,183,290 | 5/1965 | Guarnieri et al. | 264/316 |
| 3,223,056 | 12/1965 | Wilburn | 264/271 |
| 3,254,436 | 6/1966 | Bank | 40/125 E |
| 3,328,500 | 6/1967 | Barnette | 156/242 |
| 3,370,736 | 2/1968 | Wilentchik | 156/69 |
| 3,896,206 | 7/1975 | Beaver et al. | 264/258 |
| 3,919,386 | 11/1975 | Segal | 264/294 |

*Primary Examiner*—Jeffery R. Thurlow
*Attorney, Agent, or Firm*—Steinberg & Blake

[57] ABSTRACT

A method for manufacturing luminous hollow bodies to be used in signs or the like. The luminous hollow bodies are molded in such a way that first an endless side wall thereof is molded and then an end wall is molded at one end of the space confined by the endless side wall. The endless side wall is made up of a plurality of layers which give the final hollow body desired properties of light-transmission, strength, and the like. These layers while still in a soft moldable condition are placed around an inner mold member and are surrounded by an outer mold member made up of a plurality of sections which can be brought together to define with the inner mold member an endless space having the thickness and configuration of the desired side wall of the final hollow body. Thus by bringing these sections of the outer mold member together the layers between the outer and inner mold members will be confined in the space defined by the mold members pressing against each other with the innermost layer engaging the exterior surface of the inner mold member and the outermost layer engaging the inner surface of the outer mold member, so that in this way the endless side wall of the hollow body is given a precisely determined thickness and configuration as well as having at its inner and outer surfaces predetermined textures determined by the characteristics of the outer surface of the inner mold member and the inner surface of the outer mold member, respectively.

3 Claims, 5 Drawing Figures

METHOD FOR MANUFACTURING LUMINOUS HOLLOW BODIES FOR SIGNS OR THE LIKE

BACKGROUND OF THE INVENTION

The present invention relates to methods for molding luminous hollow bodies adapted to be used for signs or the like.

In known methods for manufacturing hollow bodies intended to be used in luminous signs, molds of a given annular or endless configuration are utilized with the contour of such a mold corresponding to the contour of the exterior lateral surface of the hollow body which is to be obtained. Such a mold has applied to its inner surface a suitable number of layers of a synthetic resin composition which is capable of hardening so as to form the side wall of the hollow body of the sign. Then in a subsequent operation the space confined within the thus-molded layers is closed by a suitable base and cap.

With conventional methods of the above type it is possible to achieve for the luminous hollow body an exterior surface of precisely determined configuration having certain characteristics determined by the characteristics of the inner surface of the mold which receives the layers of synthetic resin composition. However, a serious drawback present in such conventional methods resides in the fact that there is no control of the inner surface or even of the wall thickness of hollow bodies manufactured in this way. Thus the nature of the inner surface of such a molded hollow body is completely uncontrolled while at the same time the wall thickness at various parts of the contour of the resulting wall is uncontrolled and in addition there is no control of the regularity of the various layers which form the endless wall. The result of these drawbacks is that there are unavoidable irregularities in the intensity of the illumination provided by the luminous hollow body so that when it is viewed from the exterior with light shining therethrough this light will have an uncontrollable irregularity in the intensity of the illumination at various parts of the hollow body and at the same time there will be undesirable variations in the color or tint. These drawbacks of course appreciably detract from the esthetic appearance of the sign and may even prevent the message which is intended to be given by the sign from being clearly understood.

SUMMARY OF THE INVENTION

It is accordingly a primary object of the present invention to provide a method for manufacturing hollow luminous bodies in such a way that the above drawbacks are avoided.

In particular, it is an object of the invention to provide a method according to which it is possible to control in a precise manner the thickness of an endless side wall of the hollow luminous body.

Also, it is an object of the present invention to provide a method according to which it is possible to control precisely the configuration of the inner surface as well as the outer surface of the endless side wall while at the same time making it possible to precisely determine the texture or other surface characteristics at the inner and outer surfaces of the endless side wall.

Furthermore, it is an object of the present invention to provide for a method of the above type the possibility of providing the hollow luminous body with an end wall in a highly effective manner.

Thus, in accordance with the present invention it is possible to eliminate the disadvantages inherent in conventional methods by making it possible to obtain lateral walls of practically constant thickness along their entire length while at the same time providing for the endless wall a perfectly smooth inner surface or an inner surface having any desired type of finish with perfect regularity being provided in all of the layers which together form the endless wall.

In accordance with the invention a plurality of layers of synthetic resin each of which has one or more of the desired characteristics of mechanical strength, light-transmission, etc. in any desired combination are provided so as to be combined together in the finished hollow body. These layers have a width corresponding to the final depth of the hollow body. The layers which are thus provided are placed around an inner mold member the exterior surface of which has the configuration, size, and texture desired for the inner surface of the final hollow body. The layers which have thus been placed around the inner mold member are then surrounded by an outer mold member which initially is made up of a plurality of sections which can be joined together to form a continuous outer mold member which will surround the inner mold member defining therewith a cavity the contour of which matches the thickness and configuration of the desired endless side wall of the final hollow body. The arrangement is such that upon closing of the outer mold member by bringing its sections together there will be a compression of the layers of synthetic resin, which are in a soft condition, between the exterior surface of the inner mold member and the interior surface of the outer mold member so that these layers will fuse together and will be molded and stabilized in a form corresponding to the desired configuration for the endless side wall of the final hollow body which will form at least part of the final luminous sign.

This endless wall which is formed in the above manner according to the present invention is then separated from the inner and outer mold members and placed upon a smooth supporting surface with one edge of the thus-formed endless wall engaging the smooth surface. This smooth supporting surface has the property of forming a tight seal with the edge of the endless side wall so as to provide in this way a cavity within the endless wall for receiving a casting resin composition which is poured into this cavity, thus forming a molten end wall layer which rests on the supporting surface and is confined within the endless wall. For this purpose the supporting surface which receives the endless side wall may be soft so as to provide the required fluid-tightness while at the same time it is of a non-sticking property with respect to the cast resin so as to facilitate stripping thereof from the support surface. Thus the endless wall which is initially formed as set forth above itself forms with the supporting surface a mold into which the resin composition is cast. After pouring this resin composition it is left to harden so that it will form an end wall of the hollow body, the resin composition of course fusing itself to an edge region of the endless side wall. It is possible either to cast this end wall in one operation with its entire thickness resulting from a single pouring, but it is preferred according to a further feature of the invention to cast the end wall in several steps with a first layer which is poured being permitted to set and harden at least partially before the next layer is poured thereon so that in this way a plurality of layers can be poured one upon the next with each layer remaining distinct from the adjoining layers and in this way it is possible to use different resins each of which may have at least one of the desired characteristics of mechanical strength and/or light-transmission.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
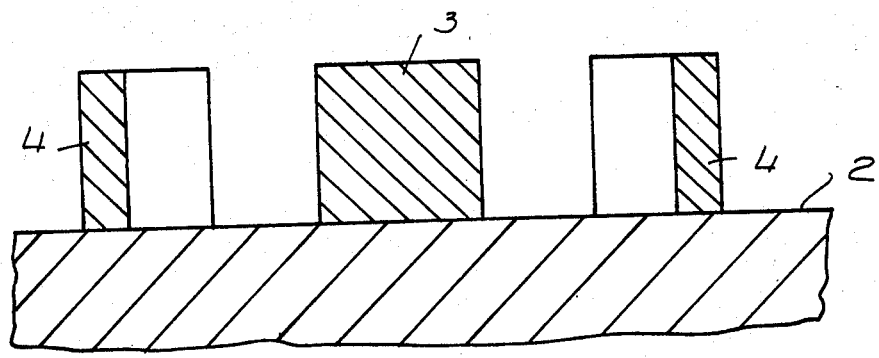
FIG. 1 is a fragmentary partly sectional elevation of a mold structure used with the method of the invention, FIG. 1 showing an inner mold member as well as sections of an outer mold member with these sections separated from each other.
Figure 2:
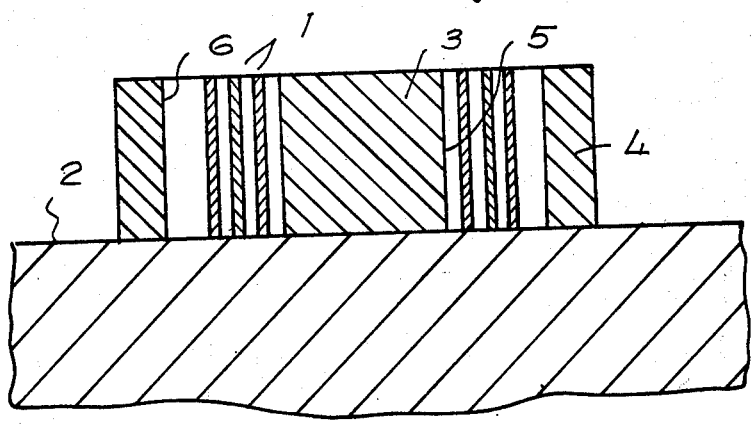
FIG. 2 illustrates in section layers of synthetic resin placed between the inner mold member, around the latter, and the section of the outer mold member which are still separated from each other in FIG. 2.

Referring to FIGS. 1 and 2, it will be seen that a plurality of strips or layers 1 of a suitable thermosetting synthetic resin, which in the condition of FIG. 2 is soft and capable of being molded, are situated between the inner mold member 3 and the separated sections of the outer mold member 4, these members resting on a suitable support 2 while the synthetic resin layers 1 are situated at their lower edges on the support 2 these layers having a width corresponding to the depth of the final hollow body which is to be molded. Each of the layers 1 has a property or characteristic which is desired in the final hollow body.

Figure 3:
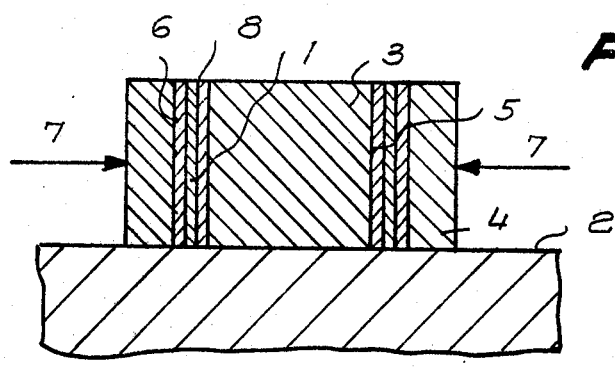
FIG. 3 shows a stage of the process subsequent to that of FIG. 2 according to which the sections of the outer mold member are brought together to compress the layers of synthetic resin between the inner and outer mold members, FIG. 3 also being a sectional elevation in the same way as FIGS. 1 and 2.

The exterior surface 5 of the inner mold member 3 has a configuration which is desired for the interior surface of the final hollow body while also having a surface texture designed to give the inner surface of the final hollow body a desired finish. In a similar manner the sections of the outer mold member 4 have inner surfaces which have a configuration and texture which will provide the molded body with an exterior surface of desired configuration and texture. When the outer mold member has its plurality of sections brought together, as shown in FIG. 3, they form an endless outer mold member completely surrounding the inner mold member 3 and defining therewith an elongated endless mold cavity of precisely determined configuration, size, and thickness. The several layers 1 are in a condition according to which they will fuse to each other while at the same time the innermost layer 1 will have a configuration and texture determined by the outer surface of the inner mold member 3 and the outermost layer 1 will have a configuration and texture determined by the inner surface 6 of the outer mold member 4. The outer mold member has its sections forcefully pressed together, as indicated by the arrows 7 in FIG. 3, so that the layers 1 are compressed between the inner and outer mold members, and the length of the layers 1 is such that they will form an endless wall completely filling the cavity defined by the inner and outer mold members. The parts are maintained in the state illustrated in FIG. 3 for a period of time necessary for the resin to harden and maintain the configuration determined by the inner and outer mold members.

In this way an endless side wall 8 for the final hollow body is molded. Once this side wall has acquired sufficient regidity to maintan its configuration without the mold members, the sections of the outer mold member 4 are separated from each other and the inner mold member 3 is removed from the interior of the endless side wall 8 which now can be safely moved about without in any way changing its configuration.

The thus-formed endless side wall 8 is now placed on another support 9 which is covered with a layer 10 of a relatively soft material the upper surface of which is engaged by the lower edge of the endless side wall manufactured according to the method illustrated in FIGS. 1 – 3. This layer 10 may be made of a relatively soft rubber, for example, or of a suitable elastic polymer, with the softness of the layer 10 being sufficient to provide a tight seal with the lower edge of the endless side wall, as viewed in FIG. 4. In addition, the layer 10 has the property of not adhering to the resin which is subsequently cast into the space confined by the endless side wall. This may be achieved either by the properties of the elastic polymer itself or by providing a suitable anti-adhesive coating on the surface of the layer 10.

Figure 4:
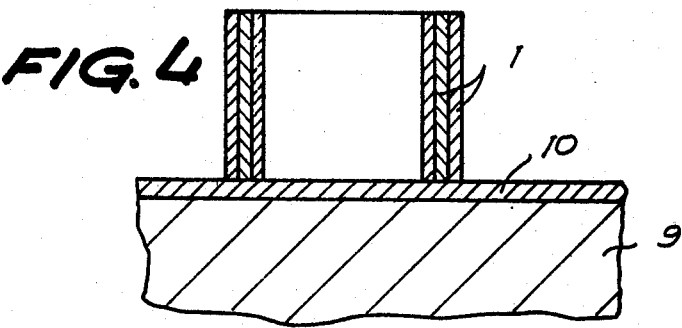
FIG. 4 illustrates in section the endless side wall formed by the method of FIGS. 1 – 3 with this endless side wall resting on a suitable supporting surface in preparation for casting the end wall.

With the endless side wall thus supported by the layer 10, on the top surface of the latter, shown in FIG. 4, a casting resin in molten condition is poured into the bottom of the cavity defined by the endless side wall 8 so that the poured resin will rest on the surface 10 and assume the configuration of the inner cavity defined by the endless side wall, the poured resin fusing itself to the inner surfce of the endless side wall at the region of its lower edge which rests against the upper surface of the layer 10. After the thus-poured casting resin hardens it will form an end wall of the completed hollow body.

Figure 5:
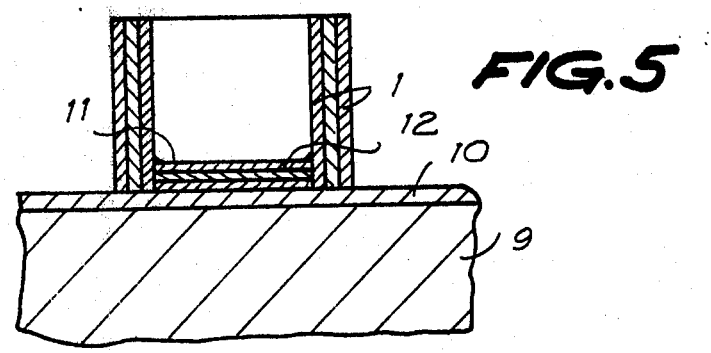
FIG. 5 illustrates the end wall which has been cast within the space confined within the endless side wall and the supporting surface engaged by the bottom edge of the endless side wall.

However, as is apparent from FIG. 5, instead of pouring the end wall 11 in a single operation so that it will have the construction of a single layer, it is preferred to pour separate layers 12, three of which are illustrated in the example of FIG. 5. Thus for each of the layers 12 it is possible to use a resin the composition of which is suitable for a desired characteristic in the final hollow body. It is preferred to carry out the pouring of the several layers 12 in such a way that each layer which is poured is permitted to harden before the next layer is poured so that each layer maintains its own characteristics while at the same time is capable of fusing to the next layer. The hardening is permitted to progress at each layer until the surface thereof will not be deformed when the next layer is poured onto a previously-poured layer. Thus in the final hollow body not only will the endless side dwall have separate layers of desired characteristics, respectively, but in addition the end wall 11 will be composed of separate distinct layers each of which will have predetermined characteristics.

What is claimed is:

1. In a method for manufacturing hollow bodies adapted to be used for luminous signs, comprising the steps of first molding an endless wall of predetermined configuration, so that said endless wall will form an open-ended endless side wall of the final hollow body, and then molding at only one end of the space confined within said endless wall an end wall of the hollow body joined to said endless wall along an end region thereof, so that the thus-molded end wall together with the thus-molded endless side wall will define a space adapted to receive light which can travel through said end and side walls of the hollow body to form at least part of a luminous sign, said molding of said endless side wall of the hollow body comprising the steps of situating around an inner mold member on an upper substantially flat surface of a support a plurality of layers of thermosetting synthetic resin which rest at bottom side edges thereof on said upper surface of said support during an interval when said layers of thermosetting synthetic resin are still hardening but have not fully set and are self-sustaining while still being soft enough to be molded to a desired configuration with each of the layers having at least one desired characteristic of strength, light-transmission, and the like which are to be included in the final hollow body, and each layer having a width corresponding to the desired depth of the luminous hollow body which is to be manufactured, and placing on said upper surface of said support around said layers a plurality of sections of an outer mold member which when joined together will surround the inner mold member while defining therewith a cavity of predetermined configuration and thickness corresponding to the desired configuration and thickness of the endless side wall of the hollow body, and then bringing said sections of said outer mold member together on said upper surface of said support for pressing the innermost of said layers against the exterior surface of said inner mold member fand the outermost of said layers against the inner surface of the outer mold member formed by bringing the sections thereof together, while said layers will engage each other and fuse together during continued setting of said layers, and maintaining said outer mold member with its sections joined to each other in engagement with said outermost layer while said innermost layer remains in engagement with said inner mold member until a sufficient time has elapsed for said layers to have hardened and set sufficiently to remain in the configuration desired for the final hollow body at the side wall thereof, and thereafter removing the outer and inner mold members from the layers so that the side wall of the hollow body produced thereby will have a precisely determined thickness as well as a precisely determined configuration at its inner surface as well as its outer surface and a texture at its inner and outer surfaces determined by the characteristics of the outer surface of the inner mold member and the inner surface of the outer mold member, respectively.

2. In a method as recited in claim 1 and wherein the molding of said end wall includes the steps of placing the thus-formed side wall on a second substantially flat supporting surface of a body with one edge of the latter side wall resting on said supporting surface and with the body having a softness sufficient for the supporting surface thereof to have the property of forming a fluid-tight seal with the edge of the endless side wall engaging the same while at the same time being incapable of adhering to said side wall and the plastic material of said end wall which forms on said surface, and then pouring into the space confined within said endless side wall a plastic material which rests on said second surface and is confined by said side wall at the region of the edge thereof which rests on said second surface, and permitting the thus-poured plastic to set and fuse to said side wall at an inner surface thereof adjacent said edge which rests on said second surface, whereupon the side wall with the end wall thus formed and adhering thereto can thereafter be removed from said second supporting surface.

3. In a method as recited in claim 2 and wherein said end wall is formed by pouring a series of layers of plastic one upon the next with a given time interval between pouring of the successive layers sufficiently great to permit each layer which is poured to set and harden before the next layer is poured thereon to an extent sufficient to provide distinct separate layers in said end wall and sufficient to prevent deformation of the surface of one layer when the next layer is poured thereon.

* * * * *